US012747761B2

(12) United States Patent
Li et al.

(10) Patent No.: US 12,747,761 B2
(45) Date of Patent: Sep. 29, 2026

(54) TORQUE LIMITER, TRANSMISSION SYSTEM, AND METHOD FOR ASSEMBLING SAID TORQUE LIMITER

(71) Applicant: NANJING VALEO CLUTCH CO., LTD., Nanjing (CN)

(72) Inventors: Liang Li, Nanjing (CN); Serkan Gürses, Istanbul (TR)

(73) Assignee: NANJING VALEO CLUTCH CO., LTD., Nanjing (CN)

( * ) Notice: Subject to any disclaimer, the term of this patent is extended or adjusted under 35 U.S.C. 154(b) by 477 days.

(21) Appl. No.: 18/248,938

(22) PCT Filed: Oct. 14, 2021

(86) PCT No.: PCT/CN2021/123798

§ 371 (c)(1),
(2) Date: Apr. 13, 2023

(87) PCT Pub. No.: WO2022/078443

PCT Pub. Date: Apr. 21, 2022

(65) Prior Publication Data

US 2023/0383796 A1 Nov. 30, 2023

(30) Foreign Application Priority Data

Oct. 14, 2020 (CN) ......................... 202011096943.0

(51) Int. Cl.
*F16D 7/02* (2006.01)
*F16D 3/12* (2006.01)
*F16F 15/129* (2006.01)

(52) U.S. Cl.
CPC ............... *F16D 7/025* (2013.01); *F16D 3/12* (2013.01); *F16D 2300/22* (2013.01); *F16F 15/1297* (2013.01)

(58) Field of Classification Search
CPC ........ F16D 7/025; F16D 3/12; F16D 2300/22; F16F 15/1297
(Continued)

(56) References Cited

U.S. PATENT DOCUMENTS 5,820,466 A 10/1998 Graton et al.
6,000,515 A 12/1999 Kimmig et al.
(Continued)

FOREIGN PATENT DOCUMENTS

CN 202811884 U 3/2013
DE 10 2017 103 574 A1 9/2017

OTHER PUBLICATIONS

International Search Report issued Feb. 7, 2022 in PCT/CN2021/123798 filed Oct. 14, 2021, 2 pages.

*Primary Examiner* — Greg Binda
(74) *Attorney, Agent, or Firm* — Oblon, McClelland, Maier & Neustadt, L.L.P.

(57) ABSTRACT

A torque limiter includes a first ring adapted to be fixed to a flywheel and being driven to rotate about a rotation axis, a second ring a certain distance from the first ring, and a compression ring between the first ring and the second ring. A friction disc is slidably sandwiched between the second ring and pressure ring, and a spring washer is arranged between the first ring and pressure ring, the pressure ring receiving a pressing force from the spring washer and pressing the friction disc against the second ring. The first and second ring are integrally formed, the first ring provided with first teeth, the spring washer provided with support teeth, and each support tooth is supported by one first tooth. A transmission system includes the above-described torque limiter.

19 Claims, 6 Drawing Sheets

(58) Field of Classification Search
USPC .................................................. 464/46, 68.1
See application file for complete search history.

(56) References Cited

U.S. PATENT DOCUMENTS

| | | | | |
|---|---|---|---|---|
| 7,824,269 | B2 * | 11/2010 | Saeki .................... | F16F 15/129 464/46 |
| 8,398,492 | B2 * | 3/2013 | Takeshita ............ | F16F 15/1297 |
| 9,127,720 | B2 * | 9/2015 | Saeki .................. | F16F 15/1297 |
| 2008/0110719 | A1 | 5/2008 | Saeki et al. | |
| 2017/0268575 | A1 | 9/2017 | Satyaseelan | |

* cited by examiner

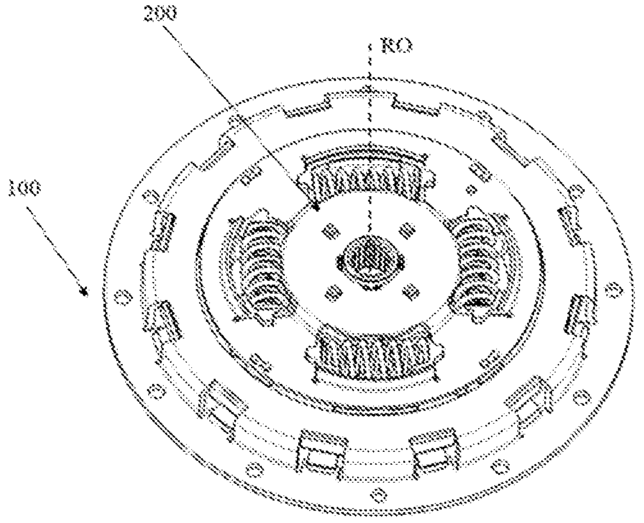
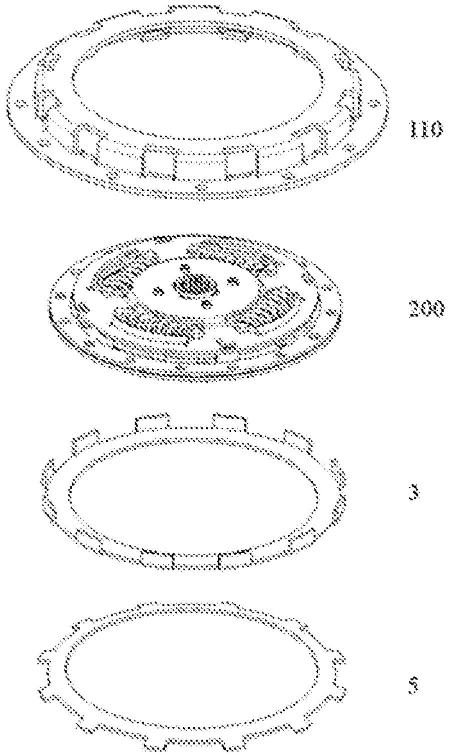
Fig.1A
Fig.1B

TORQUE LIMITER, TRANSMISSION SYSTEM, AND METHOD FOR ASSEMBLING SAID TORQUE LIMITER

TECHNICAL FIELD

The present disclosure relates to a torque limiter and a transmission system comprising the torque limiter. The torque limiter has a compact and firm structure, and may be manufactured and assembled in a simple and cost-effective manner. The present invention further relates to a method for assembling the torque limiter.

BACKGROUND ART

The torque produced by the engine of a motor vehicle is usually inconstant and fluctuates frequently. Such inconstant torque may be transmitted to the gear box, causing the gear box to vibrate and thus generating particularly undesirable noise, impact, etc. It is known that a torque fluctuation absorbing mechanism is equipped in the transmission system of a motor vehicle to reduce the adverse effects of vibration and improve the comfort of driving the motor vehicle. A torque fluctuation absorbing mechanism may allow limiting and absorbing fluctuations in the torque generated by a motor vehicle engine. It is known that a torque fluctuation absorbing mechanism may comprise a torque damper and a torque limiter. A torque damper usually absorbs and reduces torque fluctuations by a spring structure, while a torque limiter can limit a torque fluctuation that exceeds the maximum torque allowed by the torque damper. Specifically, when a torque fluctuation exceeds the maximum allowable torque, the torque limiter slides, thereby limiting the transmitted torque.

In the prior art, a torque limiter usually comprises a torque limiter cover and a friction disc that is slidable relative to the torque limiter cover. The torque limiter cover is fixedly connected to the flywheel of the motor vehicle engine and functions as a torque input portion. The slidable friction disc is clamped in the torque limiter cover by a spring force, and is fixedly connected to the torque damper to transmit torque to the torque damper. Components used to clamp the friction disc usually include an elastic component (for example, a Belleville spring) and a pressure plate.

In order to clamp the friction disc, the torque limiter cover needs to provide two axially opposite bearing surfaces. On the other hand, in order to allow convenient assembly of an elastic component, a pressure plate, and a friction disc in the torque limiter cover, the torque limiter cover is generally composed of two cover plates riveted together in the axial direction, each cover plate providing a bearing surface. The use of two cover plates increases the cost of parts, and thus the torque limiter becomes more expensive overall. In addition, in order to make the connection tight and uniform, usually a large number of rivets, for example, 12 rivets, are used in such riveting. The use of a large number of rivets will complicate the assembly process of the torque limiter, which may cause loss of rivets, impair riveting quality, and incur additional control costs for the riveting process.

To solve this problem, one possible solution is to form a torque limiter cover by using a single part. However, this requires that internal components, such as an elastic component, a pressure plate, and a friction disc, be capable of being assembled inside the torque limiter cover (the size of an internal component is required to be smaller than the opening of the torque limiter cover), and that the internal components be supportable to the torque limiter cover on both sides facing each other to provide a force of clamping the friction disc (the size of an internal component is required to be larger than the opening of the torque limiter cover), U.S. Pat. No. 9,127,720B2 discloses a torque limiter, wherein the torque limiter cover is formed by a single cover plate. The cover plate comprises a bent portion that is formed by bending at its outer circumferential portion and is axially opposite to the main body portion (see the support portion 31a of the cover plate 31 shown in FIG. 2 of U.S. Pat. No. 9,127,720B2). Therefore, the friction disc may be clamped between the main body portion and the bent portion. With a torque limiter having such a design, the number of cover plates is reduced to one, while the use of riveting is avoided, which allows a reduction of costs. However, such a bent portion is not manufacturable by stamping. Moreover, in order to facilitate the installation of a component for clamping the friction disc, the cover plate must not be bent in advance, but must be bent in the process of assembling such a torque limiter. This increases the manufacturing cost and assembling difficulty of such a torque limiter.

Therefore, a torque limiter used in the existing torque fluctuation absorbing mechanism has the shortcomings of the use of a large number of parts, a high cost, and great difficulty in assembly.

SUMMARY OF THE INVENTION

Therefore, the present disclosure is intended to solve the above-mentioned problems with an existing torque limiter, and an objective thereof is to provide a torque limiter that has a compact and firm structure and may be manufactured and assembled in a simple and cost-saving manner.

The objective is achieved by a torque limiter according to an embodiment of the present disclosure, the torque limiter comprising: a first ring adapted to be driven to rotate about a rotation axis; a second ring that is at a certain distance from the first ring in the axial direction; a pressure ring located between the first ring and the second ring in the axial direction; a friction disc slidably clamped between the second ring and the pressure ring; and a spring washer axially arranged between the first ring and the pressure ring, the pressure ring receiving a pressing force from the spring washer and pressing the friction disc against the second ring. The first ring and the second ring are integrally formed, the first ring is provided with a plurality of first teeth, the spring washer is provided with a plurality of support teeth, and each support tooth is supported by one first tooth. When the torque transmitted from the flywheel to the torque limiter is lower than the maximum torque of the torque limiter, the friction disc is rotatable together with the second ring and the pressure ring. On the other hand, when the torque transmitted from the flywheel to the torque limiter reaches or exceeds the maximum torque of the torque limiter, the friction disc is slidable between the second ring and the pressure ring, thereby limiting the torque output by the torque limiter to the maximum torque.

A first ring and a second ring of a torque limiter according to the present disclosure are equivalent to the cover plates in a torque limiter of the prior art. With such a design, the first ring and the second ring are integrally formed as a torque input portion in the form of a single component without being fixed by riveting or by another means, thereby simplifying the structure of the torque limiter and reducing the cost. In addition, in the present disclosure, the spring washer is supported on the first tooth of the first ring by support teeth, instead of the entire circumferential edge of the spring washer butting against the first ring. Thus, the spring washer may be conveniently assembled in the first ring and the second ring that are integrally designed, without the need to assemble a spring washer first and then rivet two cover plates (or bend the cover plates) as in the prior art. This also makes it easier to assemble a torque limiter according to the present disclosure and allows a reduction of its manufacturing cost.

A torque limiter according to the present disclosure may further have one or more of the following characteristics separately or in combination.

According to an embodiment of the present disclosure, a projection of at least the main body portion of the first ring in the axial direction is outside the second ring. In other words, the inner diameter of the main body portion of the first ring is larger than the outer diameter of the second ring. Preferably, a projection of the first teeth of the first ring in the axial direction is also outside the second ring.

According to this technical solution, the friction disc of the torque limiter as well as the spring washer and pressure ring used to clamp the friction disc may all be conveniently placed on the second ring in the axial direction without being hindered by the first ring, thereby simplifying the assembly of the torque limiter.

According to an embodiment of the present disclosure, the support teeth of the spring washer extend radially outwards, and the first teeth of the first ring extend radially inwards. According to this technical solution, a relatively large radial gap may be left between the main body portion of the spring washer and the main body portion of the first ring, so that the spring washer is conveniently assembled in the first ring, while the support teeth are still supportable on the first teeth.

According to an embodiment of the present disclosure, the support teeth of the spring washer are sized to be capable of passing between adjacent first teeth in the axial direction, so that the spring washer can pass over the first ring in the axial direction during assembly. In other words, the size of a gap between adjacent first teeth is larger than the size of the support teeth. After the spring washer passes over the first ring in the axial direction, the spring washer is rotatable by an angle in the circumferential direction, so that the support teeth are supported on the first teeth. According to this technical solution, the spring washer may be easily assembled into the first ring while being conveniently supportable on the first ring, thereby allowing a simplification of the assembly of the torque limiter.

According to an embodiment of the present disclosure, the first ring and the second ring are interconnected by a plurality of connecting bars, the connecting bars being formed integrally with the first ring and the second ring. The first ring, the second ring, and the plurality of connecting bars between them thus constitute an input member of the torque limiter.

According to an embodiment of the present disclosure, at least one part of the connecting bar extends axially. Thus, the connecting bar separates the first ring and the second ring in the axial direction, forming a space for installing a pressure ring, a friction disc, and a spring washer. In addition, the connecting bar is connected to the radially inner edge of the first ring and the radially outer edge of the second ring.

According to an embodiment of the present disclosure, each connecting bar is arranged between two first teeth in the circumferential direction, and an inner diameter of the connecting bar in the end region thereof that is connected to the first ring is larger than an outer diameter of the support teeth. According to this technical solution, the connecting bar is formed spaced apart from the first teeth, which means that the connecting bar is located in the gap between adjacent first teeth in the circumferential direction. During the assembly of the torque limiter, the support teeth of the spring washer pass through the gap between adjacent first teeth. By making the inner diameter of the connecting bar in the end region thereof that is connected to the first ring larger than the outer diameter of the support tooth, it is possible to ensure that the connecting bar will not hinder the movement of the spring washer over the first ring.

According to an embodiment of the present disclosure, the pressure ring is provided with a plurality of axially extending anti-rotation teeth, the anti-rotation teeth being insertable between two adjacent connecting bars. According to this technical solution, if relative sliding in the circumferential direction occurs between the pressure ring and the first ring as well as the second ring, the anti-rotation teeth can butt against the connecting bars to prevent excessive sliding of the pressure ring. In other words, the anti-rotation teeth perform the function of restricting relative sliding between the pressure ring and the first ring as well as the second ring in the circumferential direction. Preferably, the width of the anti-rotation teeth is approximately equal to the width of the gap between two adjacent connecting bars, which allows elimination of relative sliding between the pressure ring and the first ring as well as the second ring as much as possible.

According to an embodiment of the present disclosure, at least one of the plurality of first teeth is provided with a first groove, and one of the plurality of support teeth is pressed against the bottom surface of the first groove. Preferably, each of the plurality of first teeth is provided with a first groove. According to this technical solution, if relative sliding in the circumferential direction occurs between the spring washer and the first ring as well as the second ring, the support teeth can butt against a side wall of the first groove to prevent excessive sliding of the spring washer. Therefore, the first groove performs the function of restricting relative sliding between the spring washer and the first ring as well as the second ring in the circumferential direction. Preferably, the width of the first groove is approximately equal to the width of the support teeth, which allows elimination of relative sliding between the spring washer and the first ring as well as the second ring as much as possible.

According to an embodiment of the present disclosure, the spring washer further comprises a plurality of inner support teeth extending radially inwards, the inner support teeth being pressed against the pressure ring and fitting an anti-rotation device on the pressure ring. In this technical solution, the main body portion of the spring washer is not pressed against the pressure ring, but the spring washer is pressed against the pressure ring by the inner support teeth. The number and length of the inner support teeth are adjustable to change the magnitude of a force applied to clamp the friction disc, thereby adjusting the maximum torque that may be transmitted by the torque limiter.

According to an embodiment of the present disclosure, an anti-rotation device of the pressure ring comprises at least one second groove, and the inner support teeth are pressed against the bottom surface of the second groove. Preferably, the pressure ring is provided with a plurality of second grooves, and each second groove corresponds to one inner support tooth of the spring washer. According to this technical solution, if relative sliding in the circumferential direction occurs between the spring washer and the pressure ring, the inner support teeth can butt against a side wall of the second groove to prevent excessive sliding of the spring washer. Therefore, the second groove performs the function of restricting relative sliding between the spring washer and the pressure ring in the circumferential direction. Preferably, the width of the second groove is approximately equal to the width of the inner support tooth, which allows elimination of relative sliding between the spring washer and the pressure ring as much as possible.

According to an embodiment of the present disclosure, the spring washer is further provided with an avoidance groove in the base region of the inner support tooth that is connected to the main body of the spring washer, the avoidance groove being recessed inwards from the side edge of the inner support tooth. When the inner support tooth is pressed against the bottom surface of the second groove, the avoidance groove allows the side edge of the base region of the inner support tooth to avoid interference with a side wall of the second groove. Therefore, the inner support teeth may be pressed more firmly against the second groove of the pressure ring.

According to an embodiment of the present disclosure, an anti-rotation device of the pressure ring comprises a plurality of axially protruding pairs of limiting protrusions, and a spacer portion into which the inner support teeth are insertable is defined between the two limiting protrusions of each pair of limiting protrusions. In the assembled structure of the torque limiter, the inner support teeth are inserted into the spacer portion, thereby restricting relative sliding between the spring washer and the pressure ring in the circumferential direction. Preferably, the width of the spacer portion is approximately equal to the width of the inner support teeth, which allows elimination of relative sliding between the spring washer and the pressure ring as much as possible.

According to an embodiment of the present disclosure, the limiting protrusion is located at the radially inner edge of the pressure ring. Optionally, the limiting protrusion may also be arranged at a radially middle position of the pressure ring.

According to an embodiment of the present disclosure, a friction lining is arranged between the friction disc and the pressure ring and/or between the friction disc and the second ring. When the torque limiter is operating, the first ring, the second ring, the spring washer, and the pressure ring rotate together to form an input side of the torque limiter. Torque is transmitted from the input side to the friction disc through the friction lining. When the torque of the flywheel exceeds the maximum torque that may be transmitted by the torque limiter, slippage occurs between the friction lining and the friction disc, thereby eliminating torque fluctuations.

The present disclosure further relates to a transmission system comprising the torque limiter as described above and a torque damper. The torque damper comprises an input portion, an output portion, and a spring arranged to be compressed in a circumferential direction between the input portion and the output portion. The input portion of the torque damper is fixed on the first ring or friction disc of the torque limiter. The spring of the torque damper can further absorb and reduce fluctuations in the torque transmitted through the friction disc. Optionally, the first ring or friction disc of the torque limiter may also be an output portion of the torque damper.

The present disclosure further relates to a method for forming an input member or output member of a torque limiter. The input member or output member comprises: a first ring with a plurality of first teeth, a second ring at a certain distance from the first ring in the axial direction, and a plurality of connecting bars interconnecting the first ring and the second ring. The input member or output member can axially receive the following components between the first ring and the second ring: a friction disc supported on the second ring; a pressure ring supported on the friction plate; and a spring washer that is provided with a plurality of support teeth for fitting the plurality of first teeth and can press the pressure ring so that the friction disc is pressed against the second ring. The input member or output member is preferably formed by stamping. Thus, the bending step is omitted in the process of forming the input member or the output member.

The present disclosure further relates to a method for assembling a torque limiter, the method comprising the steps of providing an integrally formed input member or output member, the input member or output member comprising a first ring with a plurality of first teeth, a second ring at a certain distance from the first ring in the axial direction, and a plurality of connecting bars interconnecting the first ring and the second ring; providing a friction disc supported on the second ring; providing a pressure ring supported on the friction disc; and providing a spring washer having a plurality of support teeth, the spring washer pressing the pressure ring so that the friction disc is pressed against the second ring. In the step of assembling the spring washer, the spring washer is first moved in the axial direction over the first ring to butt against the pressure ring. The support teeth of the spring washer pass between adjacent first teeth in the axial direction. Then, the spring washer is rotated in the circumferential direction so that each support tooth is supported by one first tooth.

With the above-described method of assembling a torque limiter, by providing an integrally formed input member, the complicated step of riveting a torque limiter cover is eliminated, while it is possible to conveniently install a friction disc, a pressure ring, and a spring washer into the input member and clamp the friction disc.

From the following detailed description of the best mode of the present teaching in conjunction with the drawings, the above-described characteristics and advantages as well as other characteristics and advantages of the present teaching will become apparent.

BRIEF DESCRIPTION OF THE DRAWINGS

FIG. 1A-1B are a schematic diagram and an exploded view of a transmission system according to a first embodiment of the present disclosure.

In each drawing, the same or similar parts are indicated by the same reference numerals.

SPECIFIC EMBODIMENTS

Figure 2A:
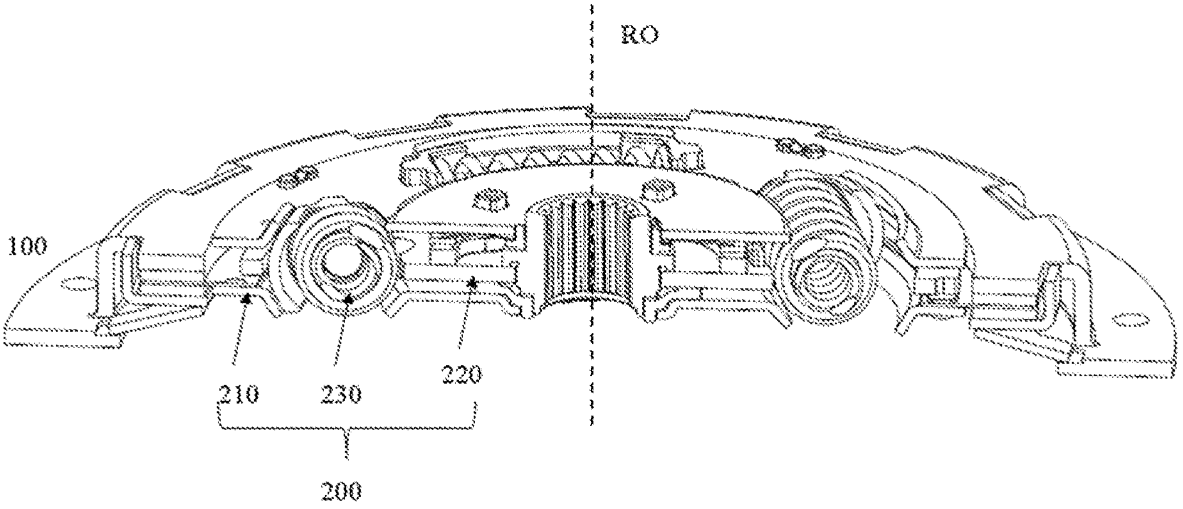
FIG. 2A is a cross-sectional view of a torque limiter according to the first embodiment of the present disclosure.

In order to make clearer the objectives, technical solutions, and advantages of embodiments of the present disclosure, the technical solutions provided by embodiments of the present disclosure will be described clearly and completely below in conjunction with the drawings for embodiments of the present disclosure.

Unless otherwise defined, the technical terms or scientific terms used herein shall have the common meanings as understood by those of ordinary skill in the art to which this disclosure belongs. “A”, “one”, “said” and similar terms used in the description and claims of the patent application of the present disclosure do not mean a quantity limit, but mean that there is at least one. “Comprise”, “include”, or any other similar term means that the element or object appearing before the term covers the elements or objects and equivalents thereof listed after the term but does not exclude other elements or objects. “Axial direction”, “radial direction” “circumferential direction”, and other directions are defined relative to the rotation axis RO of the torque limiter, wherein the axial direction is the direction of extension of the rotation axis RO, the radial direction is the direction perpendicular to the rotation axis RO, and the circumferential direction is the direction surrounding the rotation axis RO.

FIG. 1A is a schematic diagram of a transmission system according to a first embodiment of the present disclosure. FIG. 1B is an exploded view of the transmission system shown in FIG. 1A.

A transmission system is used to transmit torque between the engine and the gearbox of a motor vehicle. The gearbox may be divided into two parts: a torque limiter 100 and a torque damper 200. The torque limiter 100 is connected to a flywheel of the motor vehicle engine and driven by the flywheel to transmit torque surrounding the rotation axis RO. The torque damper 200 is located inside the torque limiter 100 as a whole, and outputs the torque transmitted by the torque limiter 100 to the gear box of the motor vehicle. The torque limiter 100 has a predetermined maximum torque, and even when the torque generated by the engine exceeds the maximum torque, the torque transmitted to the torque damper 200 does not exceed the maximum torque.

Referring to FIGS. 1A and 1B, the torque damper 200 comprises an input portion 210, an output portion 220, and four springs 230 arranged to be compressed between the input portion 210 and the output portion 220 in the circumferential direction. The input portion 210 is fixed on the friction disc 4 of the torque limiter 100 to receive the torque transmitted from the torque limiter 100. The spring 230 is a coil spring, of which one end is acted on by the input portion 210 and the other end acts on the output portion 220 to transmit torque from the input portion 210 to the output portion 220. The spring 230 can absorb and reduce fluctuations in torque by being compressed and extended. It is conceivable that the friction disc 4 of the torque limiter 100 may also be fixed to the output portion 220 of the torque damper 200.

Figure 2B:
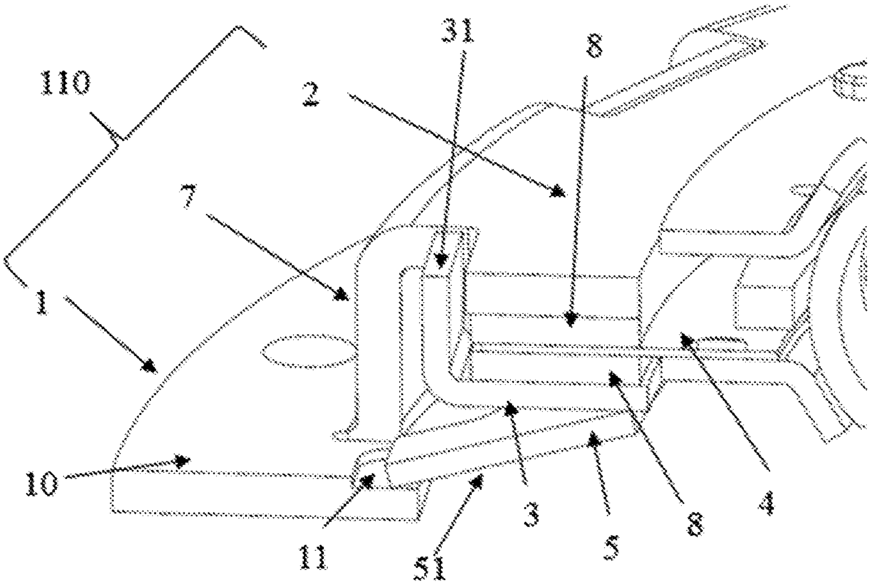
FIG. 2B is an enlarged view of a part of FIG. 2A.

Further referring to FIGS. 1A and 1B in conjunction with FIGS. 2A and 2B, the torque limiter 100 comprises an integrally formed input member 110. The input member 110 comprises a first ring 1, a second ring 2, and a plurality of connecting bars 7 interconnecting the two. The first ring 1 is adapted to be driven to rotate about the rotation axis RO. In this embodiment, the first ring 1 comprises a plurality of through holes evenly distributed on the outer circumference thereof. The through hole is used to fix the first ring 1 to a flywheel (not shown) by a screw etc. Optionally, the first ring 1 may also be fixed to the input portion 210 of the torque damper 200. The second ring 2 is formed integrally with the first ring 1 and thus rotates about the rotation axis RO together with the first ring 1 as driven by the flywheel. The second ring 2 is spaced apart from the first ring 1 by a predetermined distance in the axial direction. In addition, the inner diameter of the main body portion 10 of the first ring 1 is larger than the outer diameter of the second ring 2 so that a projection of the main body portion 10 of the first ring 1 in the axial direction is outside the second ring 2. The pressure ring 3 is located between the first ring and the second ring in the axial direction, and the friction disc 4 is slidably clamped between the second ring 2 and the pressure ring 3 by a spring washer 5 axially arranged between the first ring 1 and the pressure ring 3. The spring washer 5 is supported by the first ring 1 and presses the pressure ring 3 so that the friction disc 4 is pressed against the second ring 2. Specifically, the first ring 1 is provided with a plurality of first teeth 11, the spring washer 5 is provided with a plurality of support teeth 51, and each support tooth 51 is supported by one first tooth 11. Preferably, a projection of the first tooth 11 on the first ring 1 in the axial direction is also outside the second ring 2. In the embodiment shown in the drawing, the support teeth 51 and the first teeth 11 are the same in number, and there is a one-to-one correspondence between them. It is conceivable that the number of the first teeth 11 of the first ring 1 may be greater than the number of the support teeth 51, and that each support tooth 51 may still be supported by the corresponding first tooth 11.

Figure 3:
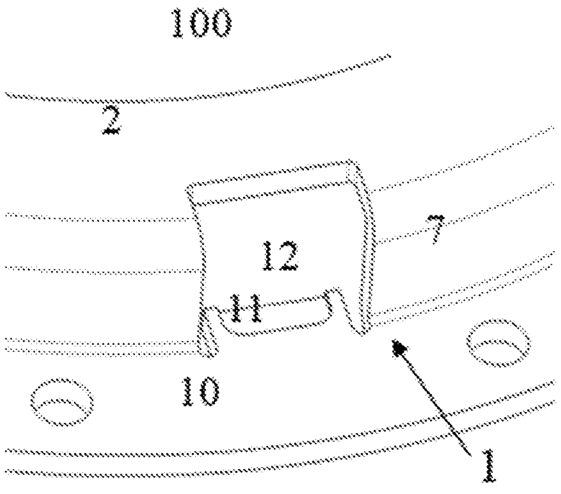
FIG. 3 is a detailed diagram of a part of an integrally formed input member in the embodiment shown in FIG. 2.

Referring to FIG. 2B in conjunction with FIG. 3, a first groove 12 is arranged on a first tooth 11. The first groove 12 extends downwards in the axial direction and into the first tooth 11. When observed in a top view, the first groove 12 roughly has a long rectangular shape with rounded corners, and the surface thereof in the radial direction is open towards the inside. Therefore, the first groove 12 has three side walls, comprising two short side walls and one radially outer long side wall. In an assembled configuration of the torque limiter 100, the support teeth 51 of the spring washer 5 are pressed against the bottom surface of the first groove 12, which means that the bottom surface of the first groove 12 provides axial support for the spring washer 5. On the other hand, the first groove 12 defines an angular position of the spring washer 5. When relative sliding occurs between the spring washer 5 and the first ring 1 in the circumferential direction, the support teeth 51 butt against a side wall of the first groove 12 to prevent excessive sliding of the spring washer 5. In the example shown in the drawing, the width of the first groove 12 is approximately equal to the width of the support teeth 51 so that relative sliding is eliminated as much as possible.

The second ring 2 and the first ring 1 are connected to each other by a plurality of connecting bars 7. The connecting bar 7 is integrally formed with the first ring 1 and the second ring 2 to form an integral input member. Specifically, one end of the connecting bar 7 is connected to the radially inner side of the first ring 1 and extends to the height of the second ring 2 in the axial direction. Then, the connecting bar 7 is bent inwards, and is connected to the radially outer side of the second ring 2 by extending in the radial direction. The inner diameter of the first ring 1 is larger than the outer diameter of the second ring 2. It is conceivable by those of ordinary skill in the art that the bent portion may be omitted, and the connecting bar 7 directly extends from the radially inner side of the first ring 1 in a direction slightly inwards in the axial direction to the radially outer side of the second ring 2.

In the circumferential direction, the plurality of connecting bars 7 of the first ring 1 are evenly distributed, and the first teeth 11 are located between two adjacent connecting bars 7. In the example shown in the drawing, the first tooth 11 substantially occupies the entire space between two connecting bars 7 in the circumferential direction. The inner diameter of the connecting bar 7 in the end region thereof that is connected to the first ring 1 is larger than the outer diameter of the support tooth 51, and the size of the gap between adjacent first teeth 11 is larger than the size of the support tooth 51. For the assembly of the spring washer 5, first the angular position of the spring washer 5 may be adjusted such that the support teeth 51 correspond to the connecting bars 7 in the circumferential direction, and then the spring washer 5 may be moved in the axial direction. Due to the above-mentioned size setting, the support teeth 51 can pass between adjacent first teeth 11 in the axial direction without being hindered by the first teeth 11 or the connecting bars 7. Thus, the spring washer 5 passes over the first ring 1 in the axial direction and butts against the pressure ring 3. Then, the spring washer 5 may be rotated to adjust the angular position of the spring washer 5 so that the support teeth 51 are pressed against the bottom surface of the first groove 12.

Figure 4:
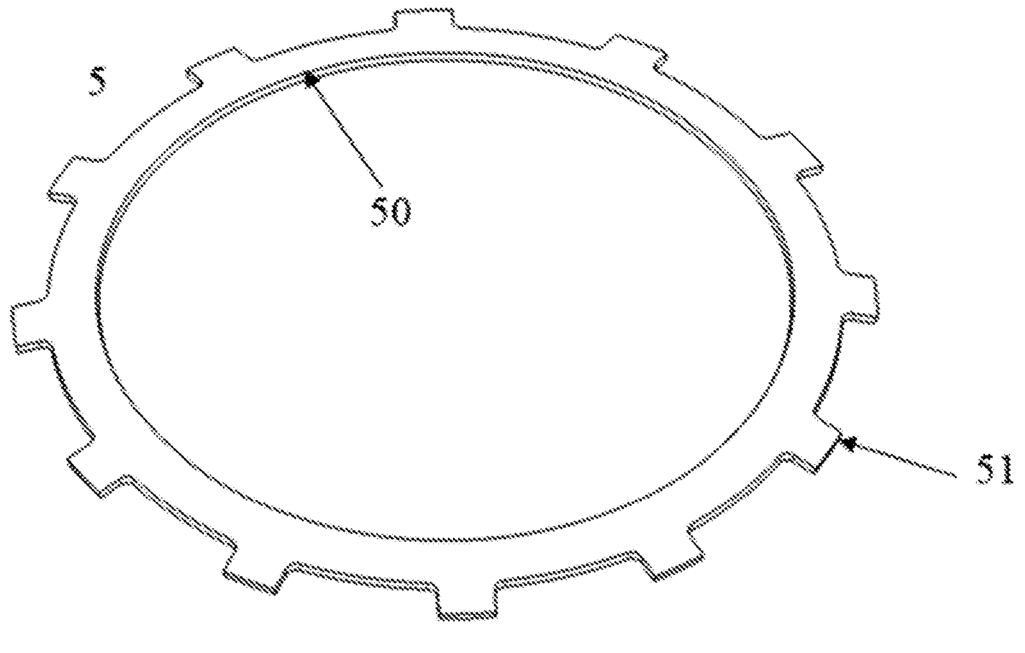
FIG. 4 is a spring washer of the embodiment shown in FIG. 2.

As shown in FIG. 4, the spring washer 5 is in the form of a Belleville spring, comprising a spring washer main body portion 50 and a support tooth 51 that extends radially outwards from the spring washer main body portion 50. As described above, in an assembled configuration of the torque limiter 100, the support teeth 51 are pressed against the bottom surface of the first groove 12, and the spring washer main body portion 50 butts against the pressure ring 3. The spring washer 5 is compressed in the axial direction, thereby applying an elastic pressing force on the pressure ring 3. The magnitude of the pressing force is adjustable by changing the material of the spring washer 5 and the size and number of the support teeth 51, and thus the maximum torque that the torque limiter 100 can transmit is adjusted.

Figure 5:
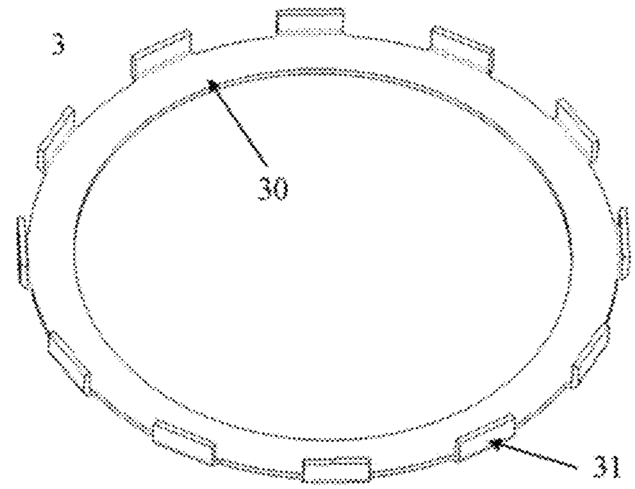
FIG. 5 is a pressure ring of the embodiment shown in FIG. 2.

FIG. 5 shows the pressure ring 3. The pressure ring 3 comprises a pressure ring main body portion 30 and a plurality of anti-rotation teeth 31 axially extending upwards from the radially outer edge of the main body portion 30. Referring to FIGS. 1A and 2B, in an assembled configuration of the torque limiter 100, the anti-rotation tooth 31 is inserted between two adjacent connecting bars 7. In other words, the angular position of the anti-rotation tooth 31 roughly coincides with the support tooth 51. If relative sliding occurs between the pressure ring 3 and the input member 110, the anti-rotation tooth 31 butts against a side wall of the connecting bar 7 to prevent further sliding of the pressure ring 3. Specifically, as shown in FIG. 2B, the connecting bar 7 roughly has an L-shape in a cross-sectional view, and the anti-rotation tooth 31 butts against the radially extending part of the L-shape. Therefore, the anti-rotation tooth 31 performs the function of positioning the pressure ring 3 in the circumferential direction. In the embodiment shown in FIG. 1A, the width of the anti-rotation tooth 31 is approximately the same as the width of the gap between two adjacent connecting bars 7, so that relative sliding is eliminated as much as possible. Those of ordinary skill in the art can understand that the width of the anti-rotation tooth 31 may also be smaller than the width of the gap between two connecting bars 7.

By the above-described configuration, the input member 110 (comprising the first ring 1, the second ring 2, and the connecting bar 7), the pressure ring 3, and the spring washer 5 of the torque limiter 100 may be driven by a flywheel to rotate together, and they jointly constitute an input side of the torque limiter 100. Torque output from the torque limiter 100 to the torque damper 200 is produced by the friction disc 4.

Referring to FIG. 2A, a radially inner part of the friction disc 4 is fixedly connected to the input portion 210 of the torque damper 200, and a radially outer part thereof is slidably clamped between the second ring 2 and the pressure ring 3. In the embodiment shown in FIG. 2A-2B, the upper surface of the pressure ring main body portion 30 of the pressure ring 3 and the lower surface of the second ring 2 are both fixed with a friction lining 8. Therefore, the friction disc 4 comes into contact and interacts with the friction lining 8 at the two axially opposite surfaces thereof. In other embodiments not shown in the drawings, it is also possible to fix the friction lining 8 to only one of the pressure ring 3 and the second ring 2. Another conceivable technical solution is that instead of providing any friction lining 8, the surface of the pressure ring 3 or the second ring 2 that comes into contact with the friction disc 4 is subjected to certain treatment so that it is made suitable for transmitting a certain torque.

When the transmission system is operating, the engine of the motor vehicle drives the first ring 1 of the input member 110 by a flywheel, and the second ring 2 (and the friction lining 8 fixed to the second ring 2) rotates integrally with the first ring 1. The pressure ring 3 (and the friction lining 8 fixed to the pressure ring 3) and the spring washer 5 are also driven by the input member 110 to rotate. The friction lining 8 and the friction disc 4 interact, thereby driving the friction disc 4 and the input portion 210 of the torque damper 200 to rotate around the rotation axis RO, so that the torque is transmitted to the torque damper 200.

When the torque transmitted by the flywheel to the torque limiter 100 is lower than the maximum torque of the torque limiter 100, the friction disc 4 and the friction lining 8 rotate together. Conversely, if the torque transmitted from the flywheel to the torque limiter 100 reaches or exceeds the maximum torque of the torque limiter 100, slippage occurs between the friction disc 4 and the friction lining 8, thereby limiting the torque transmitted to the torque damper 200 to the maximum torque of the torque limiter 100.

The torque limiter 100 as described above may be assembled in a simple manner. First, an integrally formed input member 110 is provided, which has a first ring 1, a second ring 2 spaced apart from the first ring 1 in the axial direction, and a plurality of connecting bars 7 interconnecting the two, wherein the input member 110 is manufactured by stamping or casting, for example; then, the friction disc 4 is placed on the input member 110 in the axial direction, so that the friction disc 4 is supported on the second ring 2; a pressure ring 3 is provided, the angular position of the pressure ring 3 is adjusted so that the anti-rotation teeth 31 thereof correspond to the gap between the connecting bars 7, and then the pressure ring 3 is moved axially to pass over the first ring 1 so that it is supported on the friction disc 4; a spring washer 5 with a plurality of support teeth 51 is provided, the angular position of the spring washer 5 is adjusted so that the support teeth 51 correspond to the gap between the first teeth 11 of the first ring 1, then the spring washer 5 is moved in the axial direction over the first ring 1 to butt against the pressure ring 3, the spring washer 5 is pressed so that it is compressed in the axial direction, and finally the spring washer 5 is turned until each support tooth 51 is supported by one first tooth 11. Preferably, the support tooth 51 is pressed against the bottom surface of the first groove 12 in the first tooth 11. In addition, the torque damper 200 may be installed on the friction disc 4 first, and then the friction disc 4 may be assembled. Optionally, the torque damper 200 is installed after the torque limiter 100 is assembled.

If the torque limiter 100 is assembled by the above-described method, the step of riveting the cover of the torque limiter 100 may be omitted, while a friction disc, a pressure ring, and a spring washer may be installed conveniently, which results in reductions of the cost and time spent in assembling the torque limiter 100 and an improvement of the assembly success rate.

Figure 6:
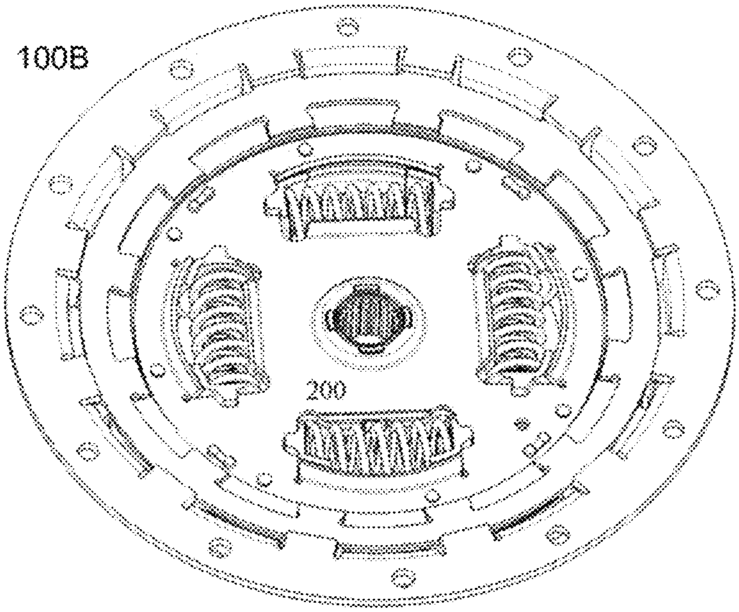
FIG. 6 is a top view of the torque limiter in an assembled configuration according to a second embodiment of the present disclosure.
Figure 7:
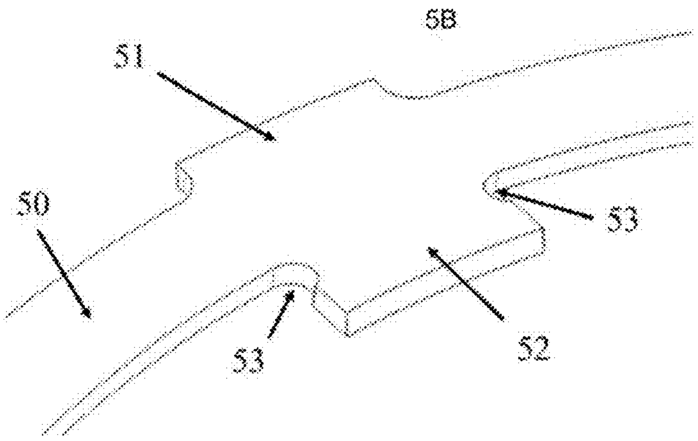
FIG. 7 is a part of the spring washer of the embodiment shown in FIG. 6.
Figure 8:
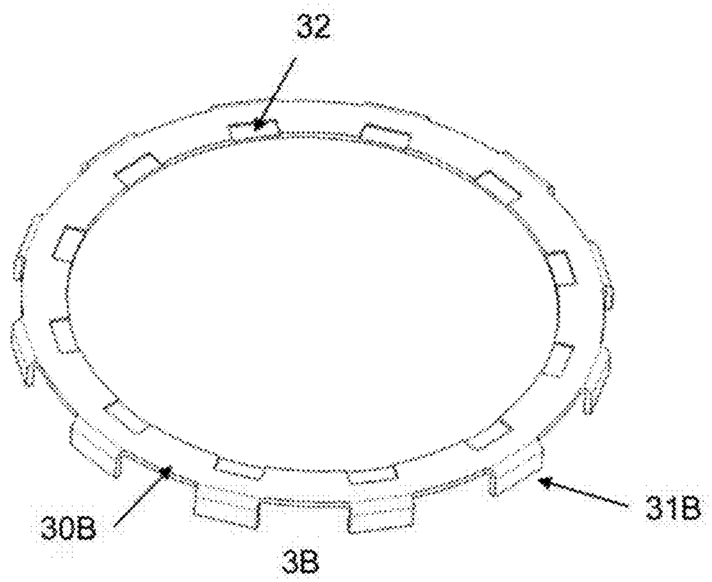
FIG. 8 is a pressure ring of the embodiment shown in FIG. 6.

FIG. 6-8 show a torque limiter 100B according to a second embodiment of the present disclosure, which differs from the above-described torque limiter 100 mainly in the configuration of the spring washer 5 and that of the pressure ring 3.

FIG. 6 is a top view of the torque limiter in an assembled configuration. FIG. 7 shows a part of the spring washer 5B. In addition to the support teeth 51 extending radially outwards, the spring washer 5B shown in FIG. 7 further comprises inner support teeth 52 extending radially inwards. There is a one-to-one correspondence between the inner support teeth 52 and the support teeth 51 in the circumferential direction. Compared with the embodiment shown in FIG. 4, the support tooth 51 of the spring washer 5B shown in FIG. 7 has a smaller length. Optionally, the inner support teeth 52 may also have different numbers and/or angular positions. In an assembled configuration of the torque limiter 100, the inner support teeth 52 are pressed against the lower surface of the pressure ring 3B, instead of being directly pressed by the spring washer main body portion 50. The magnitude of a pressing force applied by the spring washer 5B on the pressure ring 3B is also adjustable by changing the size and number of the support teeth 51.

FIG. 8 shows the pressure ring 3B that fits the spring washer 5B shown in FIG. 7. Compared with the embodiment shown in FIG. 5, the pressure ring 3B is different in that the lower surface of the pressure ring main body portion 30B is provided with a plurality of second grooves 32. There is a one-to-one correspondence between the second grooves 32 and the inner support teeth 52 of the spring washer 5. In an assembled configuration of the torque limiter 100, the inner support teeth 52 are pressed against the bottom surface of the second groove 32. If relative sliding occurs between the spring washer 5B and the pressure ring 3B in the circumferential direction, the inner support teeth 52 can butt against a side wall of the second groove 32 to prevent excessive sliding between the two. Therefore, the torque limiter 100B according to this embodiment can restrict relative sliding between the spring washer 5B and the pressure ring 3B by the inner support teeth 52 and the pressure ring 3B. Preferably, the width of the second groove 32 is approximately equal to the width of the inner support tooth 52, which allows elimination of relative sliding between the spring washer 5B and the pressure ring 3B as much as possible.

As shown in FIG. 7, the spring washer 5B is further provided with an avoidance groove 53 in the base region of the inner support tooth 52 that is connected to the spring washer main body portion 50, and the avoidance groove 53 is recessed inwards from the two side edges of the inner support tooth 52. When the inner support tooth 52 is pressed against the bottom surface of the second groove 32 of the pressure ring 3B, the avoidance groove 53 allows a side edge of the base region of the inner support tooth 52 to avoid interference with a side wall of the second groove 32. Therefore, the inner support tooth 52 is more firmly pressed against the second groove 32 of the pressure ring 3B.

In addition, in the embodiment shown in FIG. 8, the pressure ring 3B is still provided with a plurality of anti-rotation teeth 31B to prevent relative sliding between the pressure ring 3B and the input member 110 in the circumferential direction. However, the support teeth 51 of the spring washer 5B can fit the first groove 12 to prevent relative sliding between the spring washer 5B and the first ring 1, and the inner support teeth 52 can fit the second grooves 32 to prevent relative sliding between the spring washer 5B and the pressure rings 3B. Therefore, the function of preventing rotations between the pressure ring 3B and the input member 110 may be implemented indirectly by the spring washer 5B. Thus, it is also conceivable not to provide the anti-rotation tooth 31 on the pressure ring 3B.

The steps of assembling the torque limiter 100B shown in FIGS. 6 to 8 are similar to the steps of assembling the torque limiter 100 according to the first embodiment, and so will not be described again herein.

Figure 9:
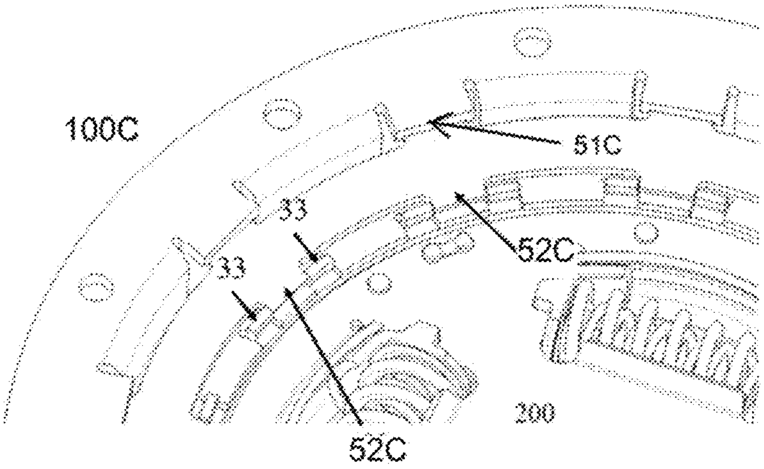
FIG. 9 is a part of a torque limiter in an assembled configuration according to a third embodiment of the present disclosure.
Figure 10:
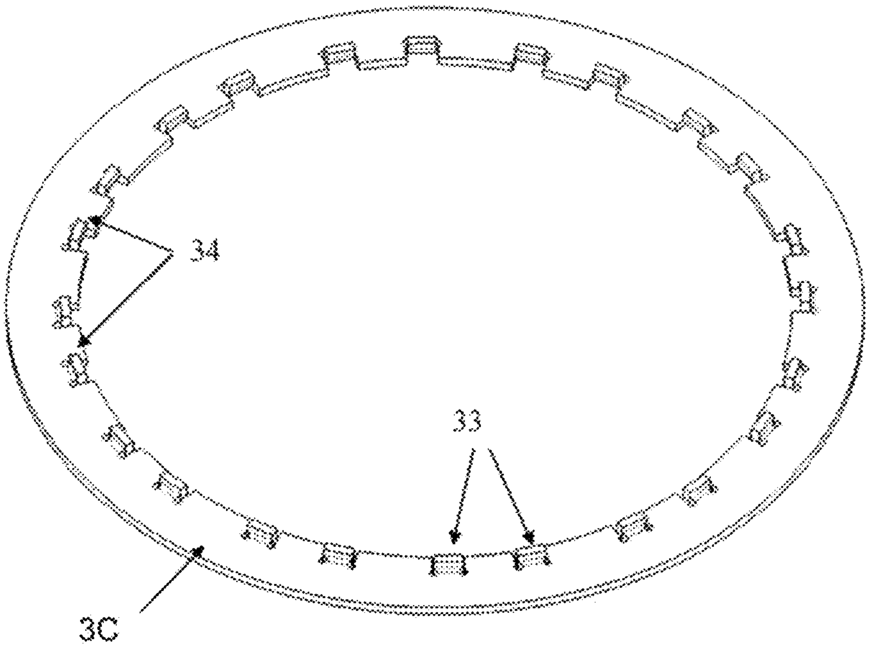
FIG. 10 is the pressure ring and spring washer of the embodiment shown in FIG. 9.

FIGS. 9 and 10 show a torque limiter 100C according to a third embodiment of the present disclosure. Referring to FIG. 9, the spring washer 5C of the third embodiment further comprises support teeth 51C extending radially outwards and inner support teeth 52C extending radially inwards. The torque limiter 100C of the third embodiment of the present disclosure is different from the torque limiter 100B of the second embodiment mainly in the configuration of the pressure ring 3.

Unlike the pressure ring with a second groove shown in FIG. 8, the pressure ring 3C shown in FIG. 10 is provided with a plurality of axially protruding pairs of limiting protrusions 33. A spacer portion 34 into which the inner support teeth 52C are insertable is defined between the two limiting protrusions of each pair of limiting protrusions 33. As shown in FIG. 9, in an assembled configuration of the torque limiter 100C, the inner support teeth 52C are inserted into the spacer portion 34. Thus, if relative sliding occurs between the spring washer 5C and the pressure ring 3C in the circumferential direction, the inner support teeth 52C can butt against the limiting protrusions 33 to prevent excessive sliding between the two, thereby restricting relative sliding between the spring washer 5C and the pressure ring 3C in the circumferential direction. Preferably, the width of the spacer portion 34 is approximately equal to the width of the inner support tooth 52C, which allows elimination of relative sliding between the spring washer 5C and the pressure ring 3C as much as possible.

In the embodiment shown in FIG. 10, the limiting protrusions 33 are arranged at the radially inner edge of the pressure ring 3C. It is conceivable that the limiting protrusions 33 may also be arranged at other positions of the pressure ring 3C, for example, at a radially middle position of the pressure ring 3C. When the limiting protrusions 33 are arranged at a radially middle position of the pressure ring 3C, the length of the inner support teeth 52C of the spring washer 5C may be reduced accordingly. The same is also true of the reverse.

Another difference from the embodiment shown in FIG. 8 is that the pressure ring 3C shown in FIG. 10 is provided with no anti-rotation teeth 31. As described above, the support teeth 51C of the spring washer 5C may fit the first groove 12 of the first ring 1, and the inner support teeth 52C may fit the limiting protrusions 33. Thus, in the embodiment shown in FIG. 10, the function of preventing rotations between the pressure ring 3C and the input member 110 is indirectly implemented by the spring washer 5C.

The steps of assembling the torque limiter 100C shown in FIGS. 9 and 10 are similar to the steps of assembling the torque limiter 100 according to the first embodiment, and so will not be described again herein.

It should be understood that the structures described above and shown in the drawings are only examples of the present disclosure, which may be replaced by other structures exhibiting the same or similar functions for obtaining the desired end result. In addition, it should be understood that an embodiment described above and shown in the drawings should be deemed to merely constitute a non-restrictive example of the present disclosure, and that it may be modified in various manners within the scope defined by the claims.

The invention claimed is:

1. A torque limiter, comprising:
- a first ring, the first ring being adapted to be driven to rotate about an rotation axis;
- a second ring that is at a certain distance from the first ring in an axial direction;
- a pressure ring located between the first ring and the second ring in the axial direction;
- a friction disc slidably sandwiched between the second ring and the pressure ring; and
- a spring washer axially arranged between the first ring and the pressure ring, the pressure ring receiving a pressing force from the spring washer and pressing the friction disc against the second ring,
- wherein the first ring and the second ring are integrally formed as a unitary and monolithic structure, the first ring is provided with a plurality of first teeth, the spring washer is provided with a plurality of support teeth, and each support tooth is supported by one first tooth.

2. The torque limiter according to claim 1, wherein
- the support teeth of the spring washer extend radially outwards, and the first teeth of the first ring extend radially inwards.

3. The torque limiter according to claim 2, wherein
- the spring washer is further provided with a plurality of inner support teeth extending radially inwards.

4. The torque limiter according to claim 3, wherein
- an anti-rotation device of the pressure ring comprises a plurality of second grooves.

5. The torque limiter according to claim 3, wherein
- an anti-rotation device of the pressure ring comprises a plurality of axially protruding pairs of limiting protrusions, and a spacer portion into which the inner support teeth are insertable is defined between the two limiting protrusions of each pair of limiting protrusions.

6. The torque limiter according to claim 5, wherein
- the limiting protrusion is located at a radially inner edge of the pressure ring.

7. The torque limiter according to claim 2, wherein
- the support teeth of the spring washer are sized to be capable of passing between adjacent first teeth in the axial direction, so that the spring washer can pass over the first ring in the axial direction during assembly, and that the spring washer is rotatable by an angle in the circumferential direction during assembly, allowing the support teeth to be supported on the first teeth.

8. A transmission system provided with a torque limiter according to claim 2, and a torque damper, wherein the torque damper is provided with an input portion, an output portion, and a spring arranged to be compressed in the circumferential direction between the input portion and the output portion; and the input portion of the torque damper is fixed on the friction disc of the torque limiter.

9. The torque limiter according to claim 1, wherein
- the support teeth of the spring washer are sized to be capable of passing between adjacent first teeth in the axial direction, so that the spring washer can pass over the first ring in the axial direction during assembly, and that the spring washer is rotatable by an angle in the circumferential direction during assembly, allowing the support teeth to be supported on the first teeth.

10. A transmission system provided with a torque limiter according to claim 9, and a torque damper, wherein the torque damper is provided with an input portion, an output portion, and a spring arranged to be compressed in the circumferential direction between the input portion and the output portion; and the input portion of the torque damper is fixed on the friction disc of the torque limiter.

11. The torque limiter according to claim 1, wherein
- the first ring and the second ring are interconnected by a plurality of connecting bars, the connecting bars being integrally formed with the first ring and the second ring.

12. The torque limiter according to claim 11, wherein
- at least one part of the connecting bar extends axially.

13. The torque limiter according to claim 11, wherein
- each connecting bar is arranged between two first teeth in the circumferential direction, and an inner diameter of the connecting bar in the end region thereof that is connected to the first ring is larger than an outer diameter of the support teeth.

14. The torque limiter according to claim 11, wherein
- the pressure ring is provided with a plurality of axially extending anti-rotation teeth, the anti-rotation teeth being insertable between two adjacent connecting bars.

15. A transmission system provided with a torque limiter according to claim 11, and a torque damper, wherein the torque damper is provided with an input portion, an output portion, and a spring arranged to be compressed in the circumferential direction between the input portion and the output portion; and the input portion of the torque damper is fixed on the friction disc of the torque limiter.

16. The torque limiter according to claim 1, wherein
- at least one of the plurality of first teeth is provided with a first groove, and one of the plurality of support teeth is pressed against the bottom surface of the first groove.

17. The torque limiter according to claim 1, wherein
- a friction lining is arranged between the friction disc and the pressure ring and/or between the friction disc and the second ring.

18. A transmission system provided with a torque limiter according to claim 1, and a torque damper, wherein the torque damper is provided with an input portion, an output portion, and a spring arranged to be compressed in the circumferential direction between the input portion and the output portion; and the input portion of the torque damper is fixed on the friction disc of the torque limiter.

19. A torque limiter, comprising:
- a first ring, the first ring being adapted to be driven to rotate about an rotation axis;
- a second ring that is at a certain distance from the first ring in an axial direction;
- a pressure ring located between the first ring and the second ring in the axial direction;
- a friction disc slidably sandwiched between the second ring and the pressure ring; and a spring washer axially arranged between the first ring and the pressure ring, the pressure ring receiving a pressing force from the spring washer and pressing the friction disc against the second ring, wherein the first ring and the second ring are integrally formed, the first ring is provided with a plurality of first teeth, the spring washer is provided with a plurality of support teeth, and each support tooth is supported by one first tooth, and wherein the first ring and the second ring are interconnected by a plurality of connecting bars, the connecting bars being integrally formed with the first ring and the second ring.

* * * * *